(12) United States Patent
Skantze (10) Patent No.: US 7,278,017 B2
(45) Date of Patent: Oct. 2, 2007

(54) METHOD AND DEVICE FOR SECURE WIRELESS TRANSMISSION OF INFORMATION

(75) Inventor: Kristofer Skantze, Lund (SE)

(73) Assignee: Anoto AB, Lund (SE)

( * ) Notice: Subject to any disclaimer, the term of this patent is extended or adjusted under 35 U.S.C. 154(b) by 837 days.

(21) Appl. No.: 09/875,095

(22) Filed: Jun. 7, 2001

(65) Prior Publication Data
US 2002/0035687 A1  Mar. 21, 2002

(30) Foreign Application Priority Data
Jun. 7, 2000  (SE) ................. 0002158

(51) Int. Cl.
*H04L 9/00* (2006.01)
(52) U.S. Cl. .............. 713/168; 380/44; 380/258
(58) Field of Classification Search ............ 401/104; 382/124, 270; 380/270, 49, 30, 44, 258; 345/179–183; 713/168, 170
See application file for complete search history.

(56) References Cited

U.S. PATENT DOCUMENTS

| 5,371,794 | A | | 12/1994 | Diffie et al. |
| 5,751,813 | A | * | 5/1998 | Dorenbos ............... 713/153 |
| 5,850,443 | A | | 12/1998 | Van Oorschot et al. |
| 5,852,434 | A | * | 12/1998 | Sekendur ............... 345/179 |
| 6,026,165 | A | | 2/2000 | Marino et al. |
| 6,209,104 | B1 | * | 3/2001 | Jalili ..................... 713/202 |
| 6,683,954 | B1 | * | 1/2004 | Searle ..................... 380/30 |
| 6,738,053 | B1 | * | 5/2004 | Borgstrom et al. ......... 345/179 |
| 6,789,191 | B1 | * | 9/2004 | Lapstun et al. ............ 713/168 |

FOREIGN PATENT DOCUMENTS

| SE | 9903541-2 | 10/1999 |
| SE | 9904745-8 | 12/1999 |
| SE | 9904746-6 | 12/1999 |
| WO | WO98/40982 | 9/1998 |

OTHER PUBLICATIONS

Schneier, Applied Cryptography, 1996, Wiley, 2nd Edition, pp. 49, 51, 173-174, 367, and 423.*
Schneier, B., Applied Cryptography, Wiley, New York, 1996.

(Continued)

*Primary Examiner*—Kim Vu
*Assistant Examiner*—Paula W Klimach
(74) *Attorney, Agent, or Firm*—Birch, Stewart, Kolasch & Birch, LLP (57) ABSTRACT

A method for secure transmission of information from a digital pen to a receiving device is provided. The method includes obtaining, in the digital pen, a message in the form of a plurality of position indications recorded from a position code on a substrate; sending at least one of the position indications to a database device; receiving from the database device an address of a receiving device which is associated with the at least one position indication and an encryption key relating to the receiving device, the encryption key being associated with the at least one position indication; encrypting the message using the encryption key received from the database device; and transmitting the encrypted message to the address of the receiving device.

35 Claims, 6 Drawing Sheets

OTHER PUBLICATIONS

LCI Technology Group, www.smartpen.net. Mar. 2001.

Young, E., "crypto algorithm benchmarks," http://www.monkey.org/geeks/archive/9704/msg00066.html. 1997.

Wei Dai's Benchmark, "Crypto++ 4.0 Benchmarks," http://www.eskimo.com/~weidai/benchmarks.html. Nov. 3, 2000.

Wei Dai's Benchmark, "Crypto++ 3.1 Benchmarks," http://www.eskimo.com/~weidai/benchmarks.html. Apr. 30, 1999.

RSA Laboratories homepage, "4.1.2.1 What key size should be used?" http://www.rsasecurity.com/rsalabs/faq/4-1-2-1.html. Sep. 2000.

Knudsen, L.R., Meier, W., et al., Analysis Methods for (Alleged) RC4, Department of Informatics, Univ. of Bergen. 1998.

* cited by examiner

METHOD AND DEVICE FOR SECURE WIRELESS TRANSMISSION OF INFORMATION

AREA OF INVENTION

The present invention relates to a method and a device for secure wireless transmission of information from a sending device to a receiving device.

The sending device may be a computer device, such as a personal digital assistant, PDA, a mobile telephone device, or an Anoto pen, described in more detail below, or any other similar device. The receiving device may be a personal computer, a server or a service provider or similar.

The transmission of information from the sender to the receiver takes place over a transmission channel comprising one or several media, such as internet, radio transmission, such as a mobile telephone network GSM or GPRS, infrared transmission, Bluetooth® transmission, electrical wires, optical wires and other media.

BACKGROUND ART

During transmission of information from a sender to a receiver, there are basically four aspects that need to be fulfilled for obtaining a secure transmission, viz.

authenticity, i.e. that the sender and receiver are the purported sender and receiver;

integrity, i.e. that the information has not been altered during the transmission;

confidentiality, i.e. that the information is kept secret during the transmission; and non-repudiation, i.e. that the information cannot be denied by either party.

These four aspects can be met by using cryptography.

SUMMARY OF THE INVENTION

A first and general object of the invention is to provide a method and device for secure wireless transmission of information from a sender to a receiver in which the authenticity, integrity, confidentiality and non-repudiation of the information can be fulfilled.

A more detailed object of the invention is to provide a method and device for secure wireless transmission of information in which the sender identity can be obtained by a secure note.

Another object of the invention is to provide a method and device for secure wireless transmission of information in which an encryption key is generated each time a message is transmitted or obtained.

A further object of the invention is to provide a method and device for secure wireless transmission of information in which the sender and/or the receiver can identify themselves to a sending device and a receiving device for increased security.

Still a further object of the invention is to provide a method and device for secure wireless transmission of information in which a random seed is generated each time a message is generated and/or each time a sender identifies himself to the sending device.

These objects are fulfilled by the method and device defined in the appended patent claims.

The invention is particularly adapted to the use with a handheld device of the type Anoto pen. The Anoto pen is described in more detail in Swedish Patent Applications Nos. 9903541-2, 9904745-8 and 9904746-6.

The Anoto pen normally has no dedicated display device. However, the Anoto pen may be provided with a normal pen or pencil, which may draw a line on the surface as the pen moves over the surface.

The Anoto pen may have transmission capabilities for connection to a personal computer or a mobile telephone, normally via infrared communication or Bluetooth communication. Thus a personal computer or a mobile telephone can be used as display device.

The Anoto pen may be arranged to sense and emit sound, vibrations, light, heat etc to give feedback to the user.

The Anoto pen may read absolute coordinates of an Anoto surface in order to determine its own position on the Anoto surface. These absolute coordinates can be used for different purposes, such as defining a bitmap image, such as a hand-drawn text or picture. Thus, a message can be written by the pen and be stored in the pen as coordinates of the movement of the pen.

In addition to the coordinates, the Anoto pen can store information about angle and pressure towards the surface. Finally, it is possible to store information about the time when a certain coordinate was read, thus giving information about pen speed and acceleration. All these information can be used for example for recognition of a handwritten signature, etc.

Further objects, advantages and features of the invention will appear from the following description, given by way of example, of an application using the Anoto pen as a sending device and a service provider as the receiving device (and receiver). The invention is not limited to the embodiment shown but may be combined in different manners.

SHORT DESCRIPTION OF THE DRAWINGS

FIG. 1.1 is a diagram of a model of the Anoto system.

FIG. 2.1 is a diagram showing the message transmission in the model of FIG. 1.1.

FIG. 2.2 is a diagram showing the basic communication flow.

FIG. 3.1 is a diagram showing a model of conventional encryption.

FIG. 3.2 is a diagram showing encryption using a public-key algorithm.

FIG. 3.3 is a diagram showing authentication using public-key algorithm.

FIG. 4.1 is a diagram showing recipient authentication.

FIG. 4.2 is a diagram showing an example of secure notes.

FIG. 4.3 is a diagram showing sender authentication.

FIG. 4.4 is a diagram showing an overview of a system for communication and key distribution.

FIG. 5.1 is a diagram showing cryptographic programs used for the Anoto implementation.

DESCRIPTION OF EMBODIMENTS OF THE INVENTION

The Anoto technology is a way to make handwritten messages become digital. Writing on special Anoto paper with the special Anoto pen, the pen reads in the message written. The pen has a transmitter and can send the message on to a computer that gets a digital copy of what was written. Using this technique it is possible, for example, to send notes taken in lectures to the computer at home, to write a message by hand and send it as email or order flowers by filling in a flowers advertisement in a magazine while sitting in a restaurant.

Figure 11:
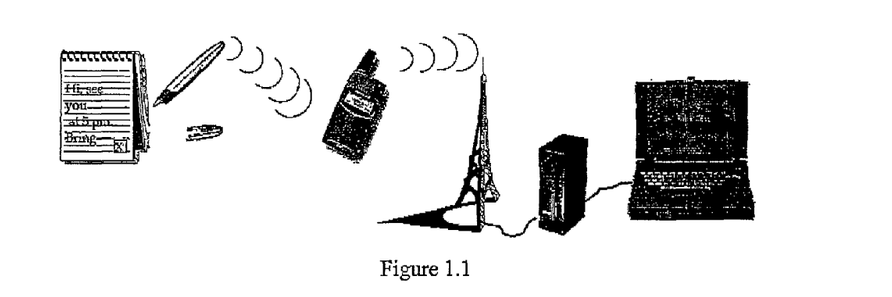

Below is described the system security design needed to establish a secure connection between the Anoto pen and the Anoto server. For example, when ordering flowers with the Anoto technique, the buyer wants to transmit his or her credit card number so that only the florist can debit the account and not someone else. Transmitting sensitive private notes over a network must be done without risking privacy of the content, see FIG. 1. To avoid forgery, secure payments require links between the credit card numbers and the individuals using them, later referred to as the authenticity problem. The paper tries to analyse what requirements are needed for the establishment of security in the Anoto system and then come up with suggestions as to how these requirements can be satisfied.

In order to understand security in a network system where human interaction is an essential factor, four cornerstones need to be considered. These are secure connection, authenticity, integrity and non-repudiation. A secure connection is needed to transfer messages securely. Authenticity is necessary in order to verify to whom messages are sent, and from whom. Integrity refers to the problem of guaranteeing consistency of messages transmitted. Non-repudiation is the way to avoid denial of a sent message.

In the Anoto case, authenticity is one of the most crucial issues for system security since it is important to know who has sent a message and to whom a message is sent. Some problems requiring attention are, for example, how to make the pen user activate the private key used for signatures, and how to make the pen user send the message to the right recipient. Neither is trivial, given the limited interface of an Anoto pen, and needs careful analysis. Based on the cryptographic introduction, some solutions to the problems are presented. System security design is also modelled to display the handling of keys. Moreover, a system cryptanalysis is performed.

A simple public-key implementation is performed for the Anoto system. For this purpose, a short study of public-key cryptography is done, and different algorithms are compared in terms of speed, security and patent restrictions. The program developed is a blend of programs from the cryptographic company iD2, as well as RC4 and RSA codes, all linked together to form Anoto's base for public-key cryptography, RC4 and RSA are chosen as the so called symmetric and asymmetric ciphers, based on the fact that they are both assumed to be strong ciphers and that RC4 is one of the fastest ciphers that exists.

In order to design a secure system for communication between pen and server, the general communication system is scrutinised. The communication is ultimately between the Anoto server and the Anoto pen. However, the system consists of much more than only these two components. The model must be refined, and all components between the pen and the server and their impact on the security must be analysed. To begin with, the system is studied and the ways of communication are analysed.

The Anoto system contains the Anoto pen, the Anoto paper and the Anoto server. The Anoto paper (from here on referred to as the paper) is regular paper with the unique Anoto pattern printed on it. This pattern shows uniqueness in every 2×2 $mm^2$ area and is as large as halt the area of the USA. Every 2×2 $mm^2$ can hence be referred to as "coordinates" giving an absolute positioning on the entire pattern. An Anoto pen user uses the Anoto pen (from here on referred to as pen user and pen, respectively) to write on the Anoto paper. The pen contains a camera that scans the itinerary of the pen over the pattern coordinates as the message is written. The coordinate stream is stored in the pen's memory until a special area, the send-box, of the field is ticked off, thereby activating the transmission from the pen. The coordinates stored can then from the absolute positioning tell exactly what had been written and reproduce it digitally. This digital copy of the message can then later either be interpreted automatically by OCR (Optical Character Recognition) or left as is and sent on as e.g., a graphical email, or utilised in any other way as explained in the introduction.

Figure 21:
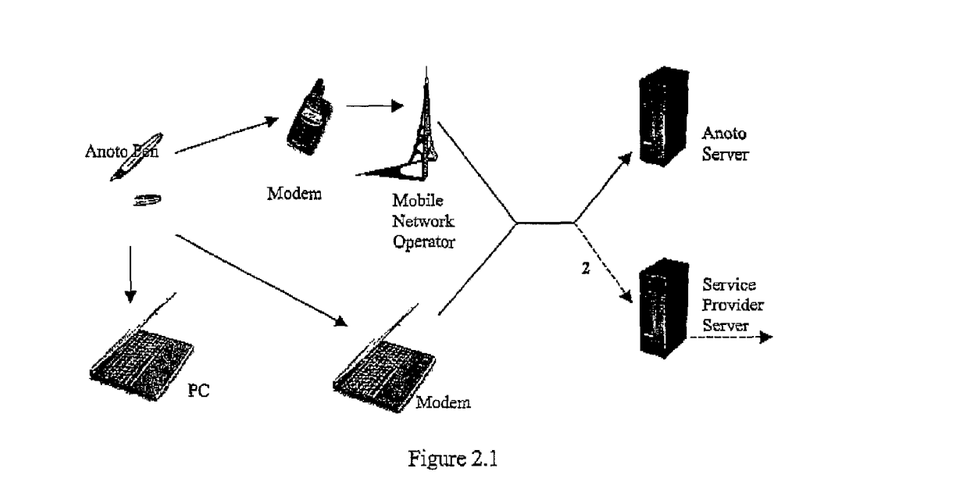

FIG. 2.1 describes the communication system on a large scale. The pen user writes a message on the paper. The pen then transmits the message via Bluetooth to a mobile phone, a computer or any other Bluetooth device. We distinguish two principally different cases; communication with a computer not connected to a network, and communication via some kind of network with e.g. an Anoto server (see FIG. 2.1). Only the latter case will be considered here. Via mobile phone or computer, acting as modem, the message is then passed on with GSM/GPRS or equivalent to a mobile network operator. The operator re-routes the message on to the Anoto server. The Anoto server parses the message address that was specified by the pen user when writing the message, and establishes a direct connection between the sender and the Service Provider Server. Finally, the Service Provider Server takes care of the message and passes it on as e.g. fax, SMS or email, or performs e.g. the purchase order requested.

From the cryptographic perspective, there are a few aspects that require attention, such as authentication and storing keys, amongst other things. Starting with these issues, we will gradually close in on the matter of general system security.

Figure 22:
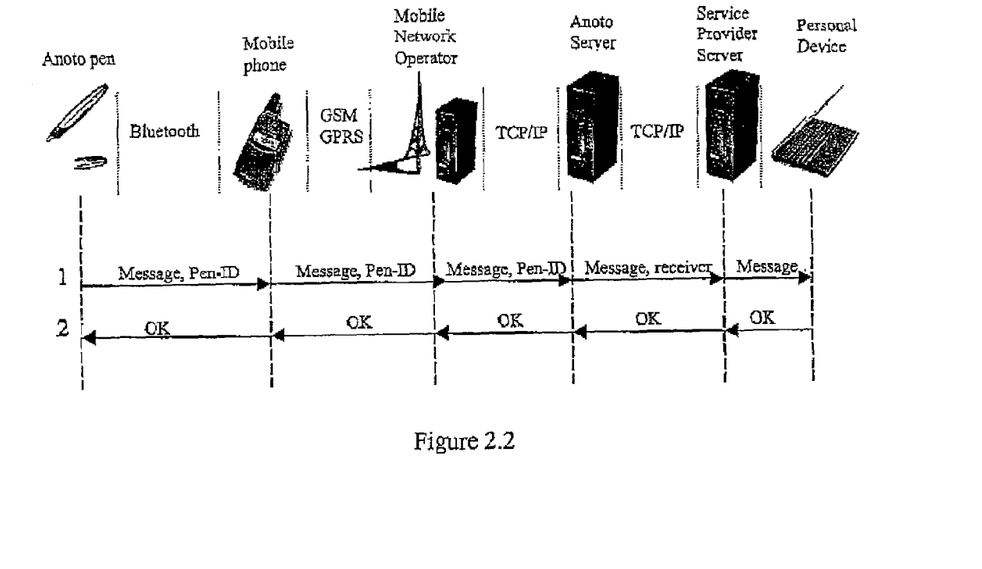

FIG. 2.2 shows the simplest kind of communication possible. The pen initiates communication with the Anoto server by sending the entire message and a pen identification number. The message passes on via Bluetooth to a mobile phone, or any other Bluetooth device, which passes the message on via e.g. GSM or GPRS to a mobile network operator. The operator routes the message on via Internet to the Anoto server. Anoto's server sends it on, again via Internet, to a Service Provider Server that takes care of the message and performs the message instruction or sends it on to someone else. After the message has been taken care of, an answer might be sent back, confirming reception of the message to the pen.

From FIG. 2.2, it is not hard to see that there are many ways to tamper with the message. Messages can be altered, deleted, forged or copied in or between any of the steps above. According to FIG. 2.2, the pen can, for instance, be used to send fake or false messages. Furthermore, the mobile phone can incorrectly send messages and the mobile network operator illegitimately read secret messages. Hackers on the Internet could even read messages or destroy the Anoto server functionality Communication according to FIG. 2.2 is hence completely insecure and gives no guarantee of transmission success or message consistency from pen to recipient.

Therefore, it is essential to determine exactly what a system like ours requires in order to avoid the different kinds of security flaws. Which rules must be satisfied, and what are these rules? How can security be guaranteed, and how can it be proven? These answers are found within cryptography and the classification of security services.

Cryptography has extended its domain from originally a military area of interest to today's consumer products. The reason lies in the electronic revolution in the last few years. Introduction of secure payments via Internet and demand for integrity has helped to introduce the topic to most company's desks. Individuals and companies strive to prevent unauthorised people to get in touch with their sensitive information. For example, when a payment is performed electronically, one wants to be convinced that no one unauthorised can read, for example, a credit card number and misuse it. It is a common requirement today that messages in transit cannot be read by any unauthorised person or machine.

There are many ways to classify security, although no universal agreement has been established. In order for a system to be secure there are four main issues to be fulfilled. These constitute the foundation upon which the security of the system lies.

One needs to be sure that someone listening to the transmission will not be able to understand the message that has been transmitted. This is called confidentiality.

The transmitter and receiver of the message must be able to trust each other's identity. This is referred to as the authenticity.

It should be possible for the receiver of the message to verify that the message has not been altered in transit—an intruder should not be able to substitute a legitimate message for a false one. This is called integrity.

A message that has been sent and received must not be denied by either side. If so, this could for example mean that a bank gets a cash transferral and later denies having received it. This is a matter of non-repudiation and more a legal matter than technical.

Since these points are of fundamental importance for security in network systems, this paper will focus on the details of such systems. Then, the consequences for the Anoto system will be analysed and evaluated.

As with most literature in the area, the problem of secure connection can be described using two fictional persons. Alice and Bob want to communicate without letting anyone unauthorised have access to the information transfer. Alice starts writing a message to Bob. She thereafter uses a secret key—a random sequence of binary digits. One possible way for encryption is then to take the message, scramble and shift the letters in a controlled way, and use her key to XOR with the shifted message. The result is a ciphertext that contains no sensitive information unless one knows how to get the same message back as started with. For this, one must know the secret transformation formula; the algorithm and the secret key. Ciphers where the same key is used for both encryption and decryption are called symmetric ciphers.

Figure 31:
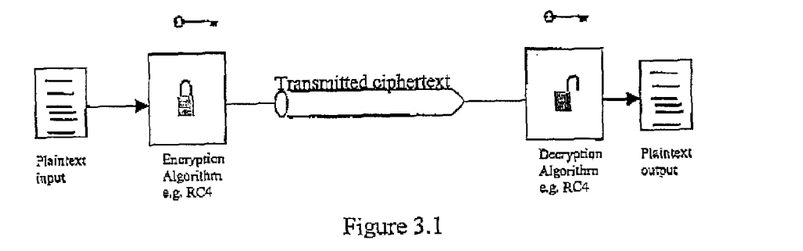

If Bob now gets Alice's key and knows the algorithm beforehand, he can easily reverse the encryption to get Alice's message back. Encryption is shown in FIG. 3.1, where the key used for encryption is the same key used for decryption. There is one problem however: what if Alice lives in Lund, Sweden and Bob in Copenhagen, Denmark across the water? They need to meet at least once to decide what key they should use. Thereafter, every time they fear the key has been broken or they simply forget the key, they again need to meet to decide on what key to use. Technically speaking they need a "secure channel" in order to exchange keys.

The difficulties arising from distributing keys brought up an ingenious technique for key-exchange. Developed by Diffie and Hellman in 1976 and called public-key cryptography, this was the first public-key algorithm ever invented. Their solution to key distribution was based on the idea of Trusted Public Directories (TPD) and Trapdoor One-Way functions. These are a family of invertible functions $f_z(\cdot)$ such that:

1) When z is known, it is easy to find algorithms $E_z$ and $D_z$ that easily compute $f_z(\cdot)$ and $f_z^{-1}(\cdot)$ respectively.
2) When z is not known it is computationally unfeasible to find the x such that $f_z(x)=y$ even if $E_z$ is known.
3) It is easy to pick z at random.

A public-key algorithm (also called asymmetric algorithm) uses key-pairs, with one key used for encryption and the other for decryption. The decryption key cannot be calculated from the encryption key within reasonable time. The algorithms are called public since the encryption key can be made public. A complete stranger can use the encryption (public) key to encrypt a message, but only a specific person with the corresponding decryption (private) key can decrypt the message.

This is how Alice can send Bob a message using public-key cryptography:

1) Alice and Bob agree on a public-key cryptosystem.
2) Bob sends Alice his public key.
3) Alice encrypts her message using Bob's public key and sends it to Bob.
4) Bob decrypts Alice's message using his private key.

Figure 32:
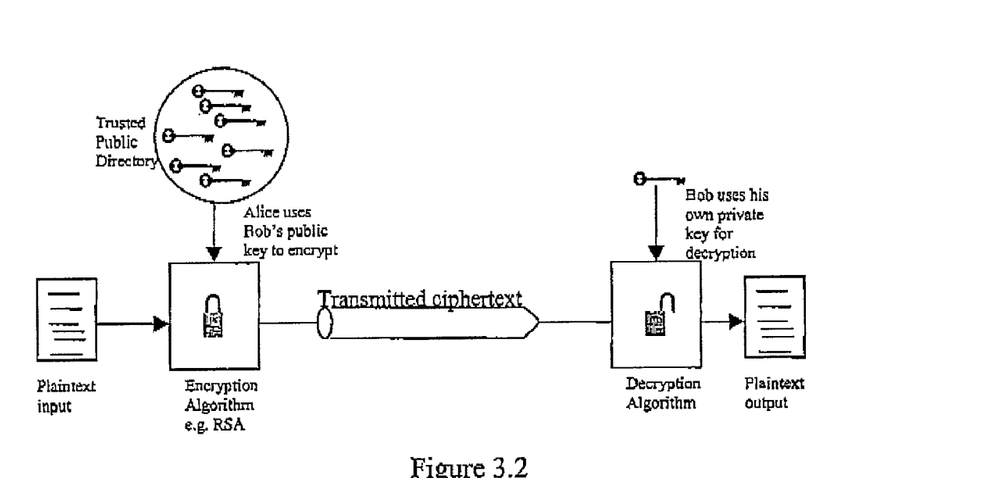

Encryption with many users connected over a network is similar to the process above, but Bob is not sending his public key to Alice. Alice instead fetches it from a Trusted Public Directory, see FIG. 3.2.

Rivest, Shamir and Adleman refined Diffie-Hellman's idea into what later became the dominant asymmetric algorithm of today, namely RSA. A more thorough description of the algorithm is presented below.

Now we have the theoretical toolkit for establishing a secure connection. We can make our own symmetric key and encrypt the message using this. Distribution of symmetric keys is taken care of by public-key cryptography. The symmetric key used for encrypting the message is encrypted by the public key and then sent. In this way, Alice and Bob can communicate securely without having to meet even once. Although we have now solved the key distribution problem, we need to solve the problem of knowing who has sent a specific message. This is the issue in the following section.

Asymmetric cryptography enables adding a signature to the message. The protocol for signing messages works as follows:

1) Alice encrypts the document with her own private key, thereby signing the document.
2) Alice sends the signed message to Bob.
3) Bob decrypts the message with Alice's public key, thereby verifying the signature.

Figure 33:
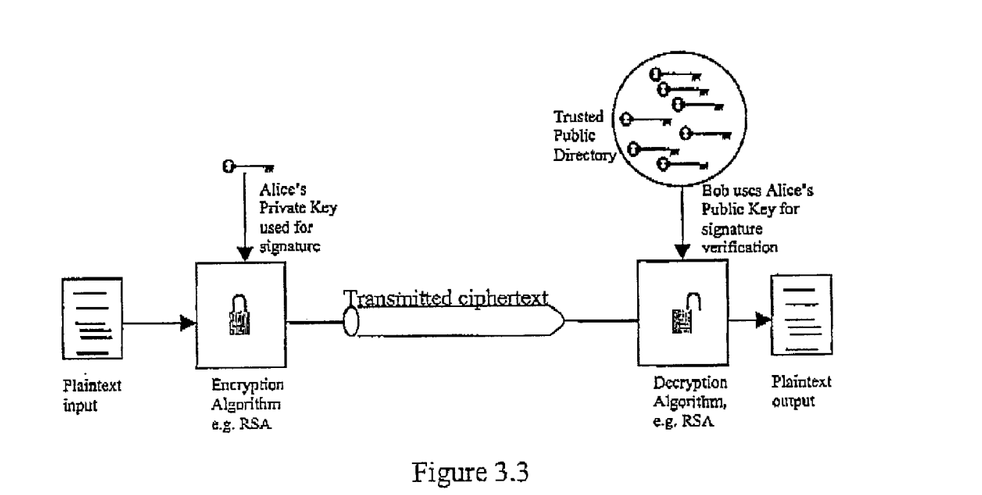

The protocol is described in FIG. 3.3.

Authentication is important in, for example, financial transactions when it is vital to verify who has performed a specific economic transaction. Below, authenticity is discussed in detail for the Anoto system.

The problem of guaranteeing consistency of the message from the transmitter to the recipient is as important as any of the other security issues described in this chapter. Although the legitimate person has signed the message, it is not possible to know from public-key distribution alone if the message has been delivered in its entirety. What is needed is a mechanism that delivers some kind of fingerprint of the unique message. Mathematically, these mechanisms are called hash-functions. Hash-functions take variable-length input strings and convert them to fixed-length output strings, so called hash values. The hash value can then be used to indicate whether a candidate input is likely to be the same as the real input. One-way hash functions are functions that easily compute hash values from the input strings, but with which it is computationally hard to generate another input value that hashes to the same value. This way one can use hash-functions when sending messages to ensure the receiver the consistency of the message. One simply makes the hash-value of the message and sends it along with the message. The receiver can then simply make a hash value of the received message and compare this to the hash value sent. If these match, the recipient is also guaranteed a match between the message received and the message sent.

The problem of non-repudiation is a legal problem as well as a technical. Signer authentication and document authentication are tools used to exclude impersonators and forgers and are essential ingredients of what is called a "non-repudiation service". A non-repudiation service provides assurance of the origin or delivery of data in order to protect the sender against denial by the recipient that the data has been received, or to protect the recipient against denial of the data being sent from the sender. Thus, a non-repudiation service provides evidence to prevent a person from unilaterally modifying or terminating legal obligations arising out of a transaction effected by computer-based means. A physical agreement is likely to be produced on a paper document of some sort; most likely the date will be written on it prior to signing the document, and the procedure will be monitored by the other party, which will then also sign the document. This procedure is then repeated, setting up two identical agreements, or one party will get a copy, allowing it to claim verification in case of a dispute. In the virtual world it is equally necessary to create statements that, firstly, state an origin and secondly, can be verified at a later stage.

One of the main issues in system security is the authenticity procedure as discussed below. This is crucial for knowing which two ends are actually communicating. Starting with a detailed study of the authenticity procedures and possibilities in the Anoto specific system, a system flowchart can be made. System-specific aspects to public-key infrastructures, such as key storage and generation of keys, are discussed. Thereafter, different aspects of cryptanalysis are examined. Paper, pen, server, and third party are all potential places to make corrupt messages. Not only a person listening to the message might be interested in knowing what it says, but the person sending it might be interested in sending a fake one, or pretend to be someone else. The Anoto server as the central point of the whole system must be robust and manage attacks. These issues are considered in the cryptanalysis.

Figure 44:
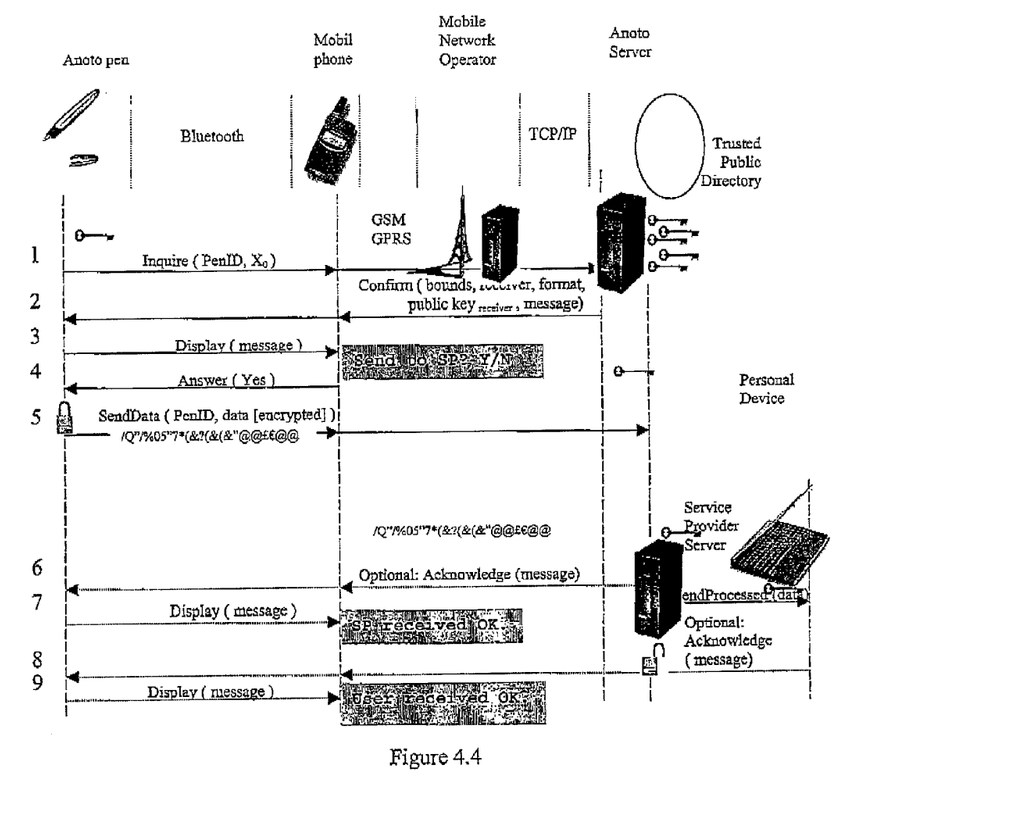

Establishing a secure channel is necessary for message confidentiality. A secure channel is an end-to-end cryptosystem where cryptographic performances take place in both ends. As we have seen above, a hybrid cryptosystem is needed. Both ends, i.e. pen and Anoto server, must support symmetric encryption to encrypt the messages to be sent. They must also manage asymmetric algorithms for encryption of the symmetric keys. A Trusted Public Directory (TPD) must be set up for the distribution of public keys. Both pen and server will support the cryptographic functions mentioned above. The Anoto server will fetch and transmit the public keys requested from the pen. Hence, the TPD should be connected to the Anoto server with a secure connection, e.g. SSL (Secure Socket Layer) (see FIG. 4.4).

Figure 41:
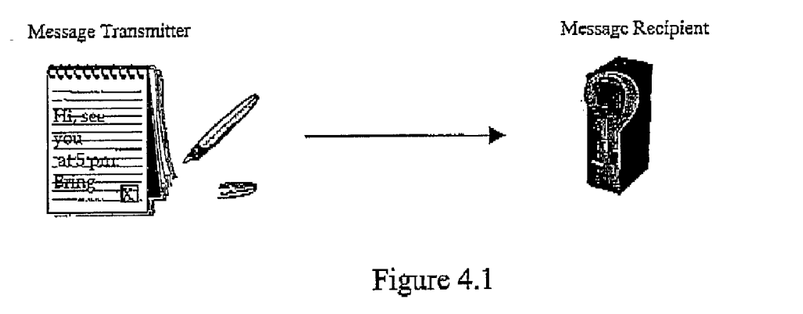
Figure 43:
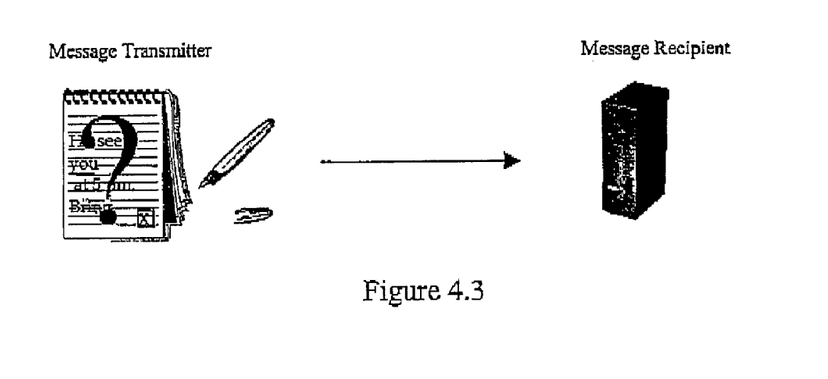

As already discussed, a secure system requires authenticity verification from both the transmitter and the receiver, see FIG. 4.1 and FIG. 4.3 respectively. Recipient authentication can be performed in a limited number of efficient ways. The two most likely to be implemented are discussed here in detail. If authenticity of the recipient's public key can be guaranteed, then the problem of recipient authentication is solved.

When the pen is sending a request for transmission the pen user gets a message back from the Anoto server revealing the true identity of the owner of the pattern. Now the user has the possibility of confirming or rejecting the transmission of the message. Because of the limited interface on the pen this is a matter that needs some attention.

Basically there are at least four theoretical ways of communication between the pen user and the pen: sound, vibrations, display, and heat.

The usual way of interaction computer-to-man is through some sort of display, which the pen lacks. Therefore, the mobile phone or the computer that the pen uses for communication with the server may be utilised to display messages.

Using a display, the communication scenario can be described as the following (see FIG. 4.4). The user writes a message and ends the message by ticking the "send-box". This makes the pen initiate a transmission. It sends some coordinates and its own ID to Anoto's server, waiting for a response from the server. The server replies with a message of who the pattern belongs to. The message is sent to the pen and from the pen sent over to the phone or computer display. The user then uses the display to confirm or reject the destination of the message by pressing yes or no. This way the receiver has been authenticated by the Anoto server, and the pen user has had a chance of verifying that the receiver is actually the intended receiver, cancelling the transmission if it is not.

If the Anoto server can be trusted, this is a secure way of solving the recipient authentication problem. The channel between the phone and the pen must be safe for a completely secure system, but it is highly unlikely anyone would manage to tamper with the phone-to-pen connection and at the same time falsely authenticate him-or herself on the recipient side. Other aspects of limited security would be if the name of the firm sent back is confusingly similar to the legitimate firm. There would then be a clear risk that the message will go astray.

Another mean of recipient authentication would be through "secure notes". A secure note is a piece of paper that the pen user carries with him or her. The note consists of fields with the Anoto pattern. The pen user does initially activate these fields by logging on to the Anoto web site. There the correct addresses to the companies of interest for the pen user can be securely downloaded. The user then uses the pen to mark the fields on the paper note writing the name of the companies and at the same time transparently attaching the correct address of the company destination to the designated field. Later, when the pen user wants to send a message to e.g. the bank, he at first draws a line over the pattern connected to the bank, thereby activating the right recipient address, and then fills in a different paper with bank transactions to be performed.

This way there is no need for a display to guarantee the pen user the correct recipient, but forces the transaction to proceed according to the address stored on the note. The address field can be said to contain both the correct recipient address and the send instruction.

Figure 42:
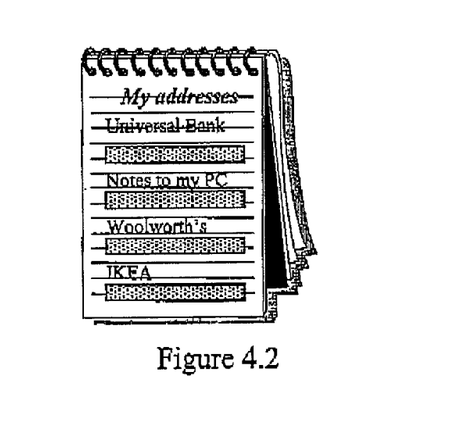

FIG. 4.2 explains the secure notes—how to initialise and later use them.

| Storing addresses on the secure note | Sending a message using secure notes |
|---|---|
| 1) The pen user looks up the addresses on the Anoto server from any PC and clicks on a company of interest. | 1) The field with the address of the recipient to send the message to, is marked with a line. |
| 2) The pen user then draws a line over the field he wants to connect to the address. | 2) The actual message is written on a note. |
| 3) The pen then activates the field and its specific pattern connecting it to the specific address. | 3) The send box is ticked for transmission. |
| 4) The procedure is repeated until the user has all addresses of potential interest stored on his secure note. | 4) The transfer of the message is performed. Optionally, a return confirmation can be sent back, such as activating a vibration in the pen for example. |

The secure note system for solving the receiver authentication problem has the advantage of not having to use a display. It is also a perfectly secure means of authentication since loss of the paper note is only loss of public information easily accessed by anyone. The paper contains no secret information whatsoever. The disadvantages are the impractical aspects of connecting recipient addresses to the pattern-strips initially, and the fact that the secure note must be brought along when one wants to send a message securely. This does however not exclude displays as means of authenticity, it just adds complementary functionality to the system. Secure notes can be said to be a rather new way of thinking in terms of local TTP (Trusted Third Party) or local CA (Certificate Authority).

Here it is described how to prove access to your private key. The receiver of the message, say a flower company, might be interested in knowing who the transmitter of the message is before debiting money for the flower purchase from the customer, i.e., the pen user (see FIG. 4.3). It is therefore necessary to make the pen user identify him- or herself in some way. The actual problem is to make the pen user activate the private key within the pen. This can be done by any of the following means: PIN code; PIN code and SIM card; Biometric solutions such as fingerprint verification (with PIN code), written signature, and other biometric options All of the examples mentioned are present on the market today. Assuming that the keys are stored within the pen, a high level of security can be obtained regarding who is sending the message.

PIN code as the only means of identifying oneself is a very practical way for identification. The interface is understandable to most people. It only requires a keyboard on either a mobile phone or a computer in order to tap in the code. With a 4-digit PIN code there is only one chance in $10^4$ that a non-authorised person manages to activate the key. It this is considered not secure enough then a longer PIN code could be chosen. PIN codes of 4 digit lengths are today often accepted in terms of security.

Using PIN codes for key activation does however require a secure communication between the mobile phone and the pen for perfect security. If someone were to listen within the range of the Bluetooth devices it would be easy to read out the PIN-code if Bluetooth were to be used without its security mode switched on. Bluetooth has its own security protocol, which could be used for secure transaction of e.g. PIN codes from the phone to the pen. If Bluetooth is later found to be a weak connection the security has to be guaranteed from the small distances over which Bluetooth is operating. This would then be a very weak link in the entire system.

One possible way of securing the PIN transmission without using Bluetooth's security layer would be to send over a public key in plain text and use this to encrypt the PIN code within the mobile phone. Someone listening to the communication would then only be able to see the public key and the returned encrypted PIN code. The pen would easily decrypt the PIN-code with its private key. The only risk with a system like this is if someone not only listens to the communication but can also send information. Then a forged public key could illegitimately be sent over and the PIN retracted.

PIN codes connected to SIM cards, e.g. the one sitting in the mobile phone, is another way of achieving authentication and designing a public-key cryptographic system. The key pair is then stored on the Smart card instead of in the pen. The user would then tap in the PIN on the keyboard and thereby activating the private key on the SIM card in the mobile phone. This does however induce a problem. The private key on the SIM card cannot be sent over to the pen, so encryption must be performed on the SIM card in the phone. This once again implies a need for a secure connection between the mobile phone and the pen. Optionally the SIM card's key pair could be used for a secure transaction of the PIN-code to activate the private key in the pen. This would however be rather impractical since first the SIM card needs to be activated by its PIN code, and then the PIN code for the pen would have to be entered to activate the penis key. The public key needs to be transmitted regardless if it is the pen's or the SIM card's, and the procedures are equally (in)secure.

Another disadvantage of using the phone's SIM card is the key connection to the Anoto server. The server must be able to be sure of the public key's origin and connection to a specific pen. The legitimacy is easier to guarantee when the key has been generated within the pen and nowhere else. An attack where an intruder sends a public key claiming it belongs to a specific pen is hard to discover and would seriously endanger a pen's security level in the future. However, it is necessary to keep on listening to the transmission after a new public-key has been sent over in order to get the secure information. This scenario seems unlikely although an attack would theoretically be successful.

With fingerprint verification there is no need for an external module to enter PIN codes on. Instead there can be a fingerprint sensor sitting on the pen, replacing the PIN code functionality. A fingerprint solution has typically a false acceptance rate of $1:10^5$, which equals a 5-digit PIN code. The false rejecting rate is however a new problem originating by the case that the system doesn't recognise the fingerprint, although its template is stored in the database. In PIN terms, this could be compared to forgetting the PIN. Fingerprint recognition for authentication is safer and more practical than PIN codes since there is no need for communication between an external unit and the pen for authentication. The fingerprint technique is the ideal way to achieve authentication in the Anoto pen case.

There is also a possibility to have the fingerprint sensor sitting on the mobile phone. The template from the fingerprint is then used to activate the SIM card in the phone. The procedure is similar to the one described above.

Handwritten signature verification is most likely the cheapest and most "elegant" solution to the problem. This biometric solution is already claimed to be working on the market. It is principally similar to all other biometric solutions in that it makes a template of a person's signature and uses this to search a match in a database of fingerprints. The unique components in a written signature are pressure, pen-angle, pen-speed and time. These parameters form the uniqueness of each signature and minimise the risk of forgery. Written hand signatures as means of identification is today a fully legal way for authentication. The negative aspect to it is that people might not want to write their signatures every time they are about to order something and have papers with their own signatures lying everywhere.

Any biometric solution could be of interest for identification if only secure enough, as e.g. iris scanning or retina scanning. The camera sensor could theoretically be used for this. It is however questionable whether the pen user would like to point the pen at the eye. Eye scanning could however sit on other devices just as well as on the Anoto pen. The problem once more then is how a secure connection between the pen and the phone can be established.

Above, the integrity was discussed, in terms of ensuring that a message cannot be altered in any way during transmission. There has always been a demand for integrity when two or more remote parties need to rely on a given quantity of information. In the virtual world the traditional seal has been replaced by a digital signature. This signature uses hashing algorithms to seal the message. Hashing algorithms can easily be implemented in the pen, as well as in the server. The algorithms could be taken from, for example OpenSSL, and be modified for the pen.

The problem of assuring the sender and the recipient the issuance of a transaction or action, as described above, requires asymmetric cryptography as well as timestamping. Timestamping is a technique similar to writing the date prior to signing documents in the physical world. Before sending a message, the current time and date is added to the message. The timestamp is then encrypted along with the message. In the Anoto system non-repudiation services can be achieved since asymmetric cryptography is already a part of the system, and it is possible to add a clock to the pen, or current time could be fetched from the Anoto server.

Now that the authentication procedures have been discussed the key distribution system needs to be designed in more detail. The best way of understanding and clearly analysing things is through drawing a flowchart of the message transmission and the necessary initiations required to establish a secure connection with the help of secure authentication.

1) The pen user writes a message on Anoto paper and by the end initiates a transmission session by ticking the "send" box. The pen then searches for a unit to send the session initiation command through. This includes the pen ID and a coordinate of the message that was written prior to ticking the send box. The message is sent via Bluetooth to e.g. a mobile phone and then via GSM, GPRS or equivalent to a mobile network operator that re-transmits the message via Internet to the Anoto server.

2) The Anoto server parses the pen ID and the coordinate. The application's address and public key connected to the coordinate is returned to the pen as well as format status such as information about cryptographic algorithms etc. At the same time the pen's public key is transmitted to the Service Provider Server for signature verification later.

3) The pen sends the message text on to a display nearby asking the pen user to accept the message destination to deliver to.

4) The pen user presses either yes or no and the answer is sent back to the pen.

5) The message to be transmitted is now encrypted and the session key used for this purpose is encrypted with the pen's private key for signature and the receiver's public key for security.

6) The encrypted message is received at the SPS (Service Provider Server) straight from the network operator. Decrypting the message is then performed by using the pen's public key received from the Anoto server and the SPS's own private key. The peni's public key is now verifying the identity of the sender. Together with the SPS's private key the message is recovered. Hence only the SPS can decrypt the message.

7) A confirmation of the message is sent back to the pen confirming the successful decryption of the message. The message is then sent from the pen to the phone to be displayed to the pen user. The service provider either parses the message and the service is performed or the message is sent on by the service provider to e.g. the pen user's personal computer.

8) Optionally the Personal Device receives the message and a confirmation is sent back via the Service Provider Server to the pen.

9) The Personal Device's 'message reception confirmed' is received by the pen and sent on to the mobile phone that displays the confirmation message.

This system is not considering usage of digital certificates and full PKI (Public Key Infrastructure) Digital certificates is, however, a very important technique to study closely, but not within the range of this paper. The security aspect in a PKI is essentially the same as the system described in FIG. 4.4. One of the two reasons for using a PKI system is for reasons of making a generic system that is easily scaleable. The system in FIG. 4.4 is limited since the Anoto server must be able to provide any of all pens' public keys upon request from any service provider. It would be easier to administer a system where the pen public keys are separately processed. The second reason is a matter of trust. It is quite plausible that service providers would prefer being able to cross-check authenticity of pen users by reading digital certificates signed by a CA and stored within repositories, instead of having to rely on the Anoto server's own list of public keys, with Anoto as the surety alone.

The system consists essentially of the pen, the pen user, the paper, the Anoto server and the third party. Any one of these constitutes a security risk to the system and needs to be analysed in detail in order to detect possible security traps.

The generation of keys can either be performed within the pen or external of the pen. If the keys are generated externally, the owner of the pen must be sure that no one listens to the transmission as the keys are transmitted to the pen for storage and secretly keeps a copy of the keys. Bluetooth's security could be used here. If the keys on the other hand are produced within the pen the private key never has to leave the pen and ideally can never be read but only used for encryption.

It must be possible to generate new key pairs in case they have been revealed. The key generation must be designed in such a way that the pen only makes new keys when getting the correct instruction from the Anoto server. Key generation is performed by algorithms using computer random seeds in combination with some physical parameters. These parameters could be any of the input values from the pen's sensors, such as pen pressure, coordinates, time or similar.

The pen needs to be able to store its own private key as well as the Anoto server's public key. The storage of the keys is a sensitive security issue. The private key must not be able to read out from the chip by listening to the communication between the processor and the flash memory. Key storage can be done in such a way that reading out the key requires very experienced expertise and expensive equipment. This is possible by either integrating the two components into one piece or making sure the communication threads between them are physically very hard to tap.

Another key generation aspect, although not essential for security, is to produce the key pair as the pen is in its idle mode and then store it for future requests to avoid waiting times for the pen user or limitations in the pens operability when there is a request for new keys.

Possibly the most vulnerable security spot in the whole system is the Anoto server. All traffic is directed through the Anoto server, which acts as a DNS (domain name system). This means that the server must be able to guarantee 100% security regarding who the message is sent on to. The server must also deliver the right address back to the pen user who then confirms or denies the transaction. If the system is tampered with, such that a message is sent back falsely claiming belonging to someone else, then the pen user is likely to send his or her message to someone unauthorised—encrypted with the forger's public key—and therefore not secure anymore.

The Anoto server must also make sure that it identifies the coordinates correctly. If a coordinate is falsely interpreted an incorrect recipient address is resent to the pen user. This could have the consequence that the pen user sends the message to the wrong destination. This is not a major problem as long as the pen user observes the incorrect recipient address. But if a system is designed so that confirmation is not required in order to send a message, then the Anoto server must guarantee the right recipient address.

The following scenario is possible in order to fool the pen user: Assume a paper with Anoto pattern and a name indicating the recipient of the message, is used by the pen user. The paper has however been forged and the pattern belongs to the forger instead of to whom it is claimed on the paper. The written message is therefore sent to another destination than the pen user intended and without the sender's knowledge. This scenario is however avoidable by using some sort of display that authenticates the recipient's identity before transmission, as in the system security design already described. The pen user would then have a fair chance of approving or denying the message transmission.

The Anoto server must make sure similar names are avoided. An example would be if a third party e.g. the airline company FlyAnytimeAnywhere and another company called FlyAnywhereAnytime are both connected to the Anoto server. A pen user using forged paper with FlyAnywhereAnytime written on it, actually leading to FlyAnytimeAnywhere is very likely to make the pen user transmit the message to the wrong destination in good faith.

The way to solve this is to make sure that names are different enough in order to avoid confusion. Additional safety is achieved if more information is returned from the Anoto server than only the name of the recipient. This could be information such as what kind of company it is, where it is located, if the person has already been shopping there or any other specific information that can make the pen user make a correct decision whether to transmit the message or not when asked for transmission confirmation.

Authenticity requires that the system can guarantee the identity of the pen user. There is hence a need for user authentication of some kind. This has been discussed explicitly above. A person using someone else's pen for secure transmission must for this purpose have their own private key stored in the friend's pen. This is a quite unlikely scenario due to the problem of administrating the connection between the key and the user.

The establishment of a secure channel between the Anoto server and the pen requires not only the system design described above but also a careful look at the choice of the specific algorithms to implement. Those algorithms must fulfil certain requirements such as security, speed and patent among other things. Those issues are studied in some detail. Finally, a pre-implementation of an Anoto security system is set up and discussed.

There are many institutions, books, newsgroups and homepages devoted to cryptographic algorithms and the trade-off between effectiveness and security. The main features that need to be considered prior to choosing cryptographic algorithms are:

1) Proven resistance to different kinds of attacks
2) Chosen-plaintext attack
3) Known-plaintext attack
4) Other attacks
5) Implementing aspects
6) Memory allocation
7) Speed
8) Platform dependence
9) Patent aspects It has been shows that RSA is the fastest algorithm for encryption and one of the fastest for decryption. RSA is slightly slower than the other algorithms for signing but among the fastest for verification. ISA, Rabin and LUC are the only algorithms that can be used for encryption/decryption as well as for signature/verification.

RSA is an asymmetric algorithm developed by Rivest, Shamir and Adleman in 1977. This was the second public-key algorithm developed and is still the most popular public-key algorithm. It can be used for both encryption and digital signatures. As seen from the Appendix, RSA is faster than the other algorithms for encryption and about as fast for decryption. Signing takes slightly longer with RSA, but verification only a fraction of the time it takes for the others.

RSA has been on the market for over 20 years and has been subject to extensive cryptanalysis. It was in 1994 broken for a key length of 428 bits by 1600 computers after 8 months work. A key size of 1024 bits is by some considered secure for most applications today, but other claim more than 1024 bit key length for good security for the next 20 years.

The importance of the key lengths of the asymmetric keys must not be underestimated. Normally, a 2048 bit long key is required to guarantee the security of the message for the next 20 years using the RSA algorithm, However 1024 bit keys are still often in use today.

RSA Laboratories currently recommends key sizes of 1024 bits for corporate use and 2048 bits for extremely valuable keys like the root key pair used by a certifying authority. Several recent standards specify a 1024-bit minimum for corporate use. Less valuable information may well be encrypted using a 768-bit key, as such a key is still beyond the reach of all known key-breaking algorithms. Key size should however always be chosen according to the expected lifetime of the data.

RSA is known to be very vulnerable to chosen plaintext attacks. There is also a new timing attack that can be used to break many implementations of RSA. The RSA algorithm is believed to be safe when used properly, but one must be very careful when using it to avoid these attacks.

RC4 (or Arcfour) is a variable-key-size stream cipher developed in 1987 by Ron Rivest. It is claimed as a proprietary system by RSADSI and is proprietary in that RC4 is considered to be a trade secret of RSADSI. It was first published in 1994 as someone anonymously posted source code in a newsgroup. People with legal copies of RC4 could confirm compatibility and the algorithm was no longer a secret. RC4 is a very simple code and possible to implement in two lines of code in Perl. The cipher has a key size of up to 2048 bits (256 bytes) and is a relatively fast and strong cipher. Using the same key on two different messages makes it very weak. It is thus useful in situations in which a new key can be chosen for each message. The key stream is independent of the plaintext.

The algorithm has been broken for 40 bit keylengths. It has however not yet been broken for longer keylengths and is presumably secure enough for keylengths of 128 bits and longer. Cryptanalysis has shown some vulnerable features of the algorithm, but is claimed to cause no threat to alleged RC4 in practical applications. The code is used in a number of commercial systems like Lotus Notes and secure Netscape.

RSA is patented under U.S. patent but the patent expires on Sep. 20, 2000.

The cryptographic program written to establish the secure connection between the pen and server is based on iD2's commercial SDK. This gives a platform to work on for future enlargements of the security and identification demands. The SDK doesn't reveal the source code used for the algorithms. Since the pen has limited memory, computing power and energy supply, the code must be 100% known before transferring into the pen, and therefore iD2's program has only been used as an interface for the program which consists of source code taken from well-known resources.

The program is for reasons of speed written in C. Code for alleged RC4 has been taken from Internet where a few slightly different implementations have been published. The RSA implementation too has been taken from Internet in a version called RSAeuro implemented by J. S. A. Kapp in 1994.

Some standards have been developed for cryptographic systems. iD2 has therefore written their program according to the PKCS #11 standard set by RSA Data Security Inc in 1994. This standard specifies an API, called Cryptoki, to devices which hold cryptographic information and perform cryptographic functions. Cryptoki, pronounced "crypto-key" and short for cryptographic token interface, follows a simple object-based approach, addressing the goals of technology independence (any kind of device) and resource sharing (multiple applications accessing multiple devices), presenting to applications a common, logical view of the device called a cryptographic token.

Figure 51:
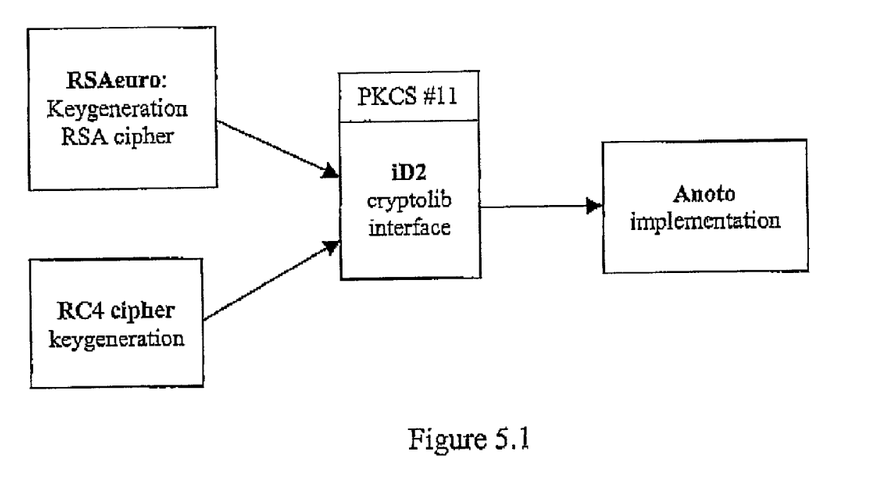

The Anoto cryptographic program works like the following (see FIG. 5.1):

Encryption (In the Pen)

1) Initially a keypair is generated and the private key is securely stored in the pen. The public key is sent over to the Anoto server.

2) A symmetric session RC4 key is generated with help from a random seed on every occasion there is a transmission.

3) The session key encrypts the message that is to be transmitted.

4) The session key is then "wrapped" (encrypted) by the asymmetric private key for signature and by the Anoto Server's public key for SPS for encryption. The message is then transmitted.

Decryption (On the Service Provider Server)

1) The public key of the pen is sent over to the Service Provider Server (SPS) and used for verification of the sender. The SPS's private key is then used for decrypting the symmetric key.

2) The symmetric key is used to decrypt the message.

3) A confirmation can be sent back to the pen that the message has been received and successfully opened.

Everything within the pen must be fully optimised and Anoto requires full control of the cryptographic implementations on the pen. The Anoto implementation is based on iD2's program iD2cryptolib. The reason for choosing this system is the scalability and very high level of security.

As asymmetric key distribution system RSA was chosen and RC4 as the symmetric cipher for reasons of speed.

RSAeuro has a program called redemo. This is a demo application implemented by J. S. A. Kapp using RSAeuro cryptographic toolkit. It has complete functionality in asymmetric and symmetric encryption and decryption, hashing, key generation and random number generation. The only parts taken from this program are key generation algorithm and the asymmetric key algorithm for encryption and decryption.

Key generation is taken from the RSAeuro program as well as the public-key encryption and decryption algorithms. The RC4 algorithm and symmetric session key generation is taken from the RC4 program.

Focus has been on authentication proceedings. These are important in all public-key systems, however complicated in the Anoto case with the limited interaction interface between pen and user. Pen user key activation was studied and solutions presented, such as biometric solutions or PIN codes. Biometric solutions for signatures were found to be most practical, PIN codes for key activation can be considered as safe as biometric solutions, but need a keyboard to type the PIN in.

A system security flowchart was made, showing the administration of keys in Anoto's communication system. The security system is an end-to-end public-key communication system and is not considering all communication ways between pen and server. Due to all the different transmissions from pen to server over Blutooth, GSM/GPRS, TCP/IP, Mobile Network Operators and so on, achieving high security requires an end-to-end security system.

In future hardware design of the pen, serious considerations should be made regarding secure storage of keys in the hardware. Security can be significantly increased if processor and memory is integrated into one unit.

The invention claimed is:

1. Method for secure wireless transmission of information from a digital pen to a receiving device, comprising:

obtaining, in the digital pen, a message in the form of a plurality of absolute positions recorded from an absolute position coding pattern on a substrate;

obtaining, in the digital pen, at least one absolute position recorded from an absolute position coding pattern on a secure note;

sending said at least one absolute position recorded from the secure note to a database device, in which said at least one absolute position is associated with an address of the receiving device and an encryption key of the receiving device;

receiving, in the digital pen, said address and said encryption key of said receiving device, from the database device;

encrypting the message to be transmitted using said encryption key received from the database device;

obtaining a transmission channel from the digital pen to the receiving device; and transmitting the encrypted message to the receiving device, wherein the information is decrypted at the receiving device.

2. Method as claimed in claim 1, further comprising:
encrypting the message in the digital pen by a symmetric key and decrypting the message in the receiving device by the same key.

3. Method as claimed in claim 2, wherein the symmetric key has been agreed upon in advance and is stored in the digital pen and the receiving device.

4. Method as claimed in claim 2, further comprising:
adding the symmetric key to the message after encryption with the symmetric key,
encrypting at least the symmetric key by a public key of an asymmetric key having a private key and a public key and belonging to the receiving device,
decrypting the symmetric key by the private key of the receiving device; and
using the symmetric key for decrypting the message.

5. Method as claimed in claim 4, further comprising:
encrypting the already encrypted symmetric key in the digital pen by a private key of an asymmetric key having a private key and a public key and belonging to the digital pen;
obtaining, in the receiving device, the digital pen public key from one of the digital pen and a separate server; and
decrypting the symmetric key by the public key of the digital pen in the receiving device and by the private key of the receiving device.

6. The method as claimed in claim 1, wherein sending said at least one absolute position recorded from the secure note to a database device occurs via Bluetooth through a mobile telecommunications device.

7. A method for secure transmission of information from a digital pen to a receiving device, comprising:
obtaining, in the digital pen, a message in the form of a plurality of position indications recorded from a position code on a substrate;
sending at least one of said position indications to a database device;
receiving from the database device an address of a receiving device which is associated with the at least one position indication and an encryption key relating to said receiving device, said encryption key being associated with the at least one position indication;
encrypting said message using the encryption key received from the database device; and
transmitting the encrypted message to the address of the receiving device.

8. Method as claimed in claim 7, further comprising:
identification of a user of the digital pen to the digital pen, and or identification of the receiver to the receiving device by a verification means, wherein the verification means is at least one of PIN-code, optical, sound, vibration, heat, speed, angle, time, pressure, acceleration, absolute coordinate, handwritten signature, voice recognition, fingerprint sensor, and other biometric means.

9. Method as claimed in claim 8, further comprising:
obtaining a random seed for generating encryption key by means of the verification means during the identification step.

10. Method as claimed in claim 7, further comprising:
obtaining a random seed for generating an encryption key during the step of obtaining the message.

11. Method as claimed in claim 7, further comprising:
generating, in the digital pen, a digital pen private key and digital pen public key pair using a random seed obtained using a physical parameter relating to the user of the digital pen, wherein the physical parameter is at least one of handwritten signature recognition, fingerprint information and movement of the digital pen wherein movement of the digital pen is at least one of acceleration, speed, time, and vibration.

12. Method as claimed in claim 11, wherein the digital pen private key is added to the message unencrypted, as digital pen identification.

13. A method as claimed in claim 7, wherein the encryption key is a public key of an asymmetric key pair belonging to the receiving device.

14. A method as claimed in claim 7, wherein the step of sending further comprises sending an identity of the pen to the database device.

15. A method as claimed in claim 7, wherein the step of encrypting further comprises encrypting the message in the digital pen by a symmetric key before encrypting the message with the encryption key received from the database device.

16. A method as claimed in claim 15, wherein the symmetric key is added to the encrypted message before encrypting it with the encryption key received from the database device.

17. A method as claimed in claim 7, wherein the step of transmitting comprises transmitting an identity of the pen to the address of the receiving device.

18. A method as claimed in claim 7, further comprising displaying the address of the receiving device to a user of the digital pen and obtaining one of a confirmation and a rejection of the address from the user.

19. A method as claimed in claim 7, wherein at least one of the sending step, the receiving step and the transmitting step is carried out over a network.

20. A method as claimed in claim 7, wherein the digital pen is configured to generate at least one encryption key using a random seed based on a physical parameter of a sensor of the digital pen.

21. A system for secure transmission of information from a digital pen to a receiving device, comprising:
a digital pen, which is configured to obtain a message in the form of a plurality of position indications recorded from a position code on a substrate and to send at least one of the position indications to a database device; and
a database device, which stores an address of the receiving device associated with said at least one of the position indications, and which is configured to send an encryption key relating to the receiving device and the address of the receiving device to the digital pen in response to the receipt of said at least one of the position indications, said digital pen being further configured to encrypt the message using the encryption key received from the database device and transmit the encrypted message to the address of the receiving device.

22. A system as claimed in claim 21, wherein the digital pen has a pen identity, which is sent to the database device together with said at least one of the position indications.

23. A system as claimed in claim 21, wherein the database device is configured to send an encryption key belonging to the digital pen to the receiving device.

24. A system as claimed in claim 21, wherein the digital pen stores a public key of an symmetric key pair belonging to the database device.

25. A system for secure wireless transmission of information from a digital pen to a receiving device, comprising:
- a substrate provided with an absolute position coding pattern coding absolute positions,
- a secure note provided with an absolute position coding pattern coding at least one absolute position,
- a database device, in which said at least one absolute position is associated with an address of the receiving device and an encryption key of the receiving device,
- a digital pen configured for obtaining a message from the absolute position coding pattern of said substrate and for receiving said address of the receiving device and said encryption key from the database device,
- encryption means, in the digital pen, for encrypting the message to be transmitted by an said encryption key received from the database device;
- a transmission channel from the digital pen to the receiving device for transmitting the encrypted message to the receiving device, wherein the information is decrypted at the receiving device.

26. The system as claimed in claim 25, wherein the receiving address is obtained by transmitting said at least one absolute position coded on the secure note to the database device, and using said receiving address for the transmission.

27. The system as claimed in claim 25, wherein
the encryption means is arranged to encrypt the message in the digital pen by a symmetric key and that the decryption means is arranged to decrypt the message in the receiving device by the same key.

28. The system as claimed in claim 27, wherein the symmetric key has been agreed upon in advance and is stored in the digital pen and the receiving device.

29. The system as claimed in claim 27, wherein
the symmetric key is added to the message after encryption with the symmetric key;
the encryption means is arranged to encrypt at least the symmetric key by a public key of an asymmetric key having a private key and a public key and belonging to the receiving device;
the decryption means is arranged to decrypt the symmetric key by the private key of the receiver in the receiving device; and
the decryption means is arranged to use the symmetric key for decrypting the message.

30. The system as claimed in claim 29, wherein
the encryption means is arranged to encrypt the already encrypted symmetric key in the digital pen by a private key of an asymmetric key having a private key and a public key and belonging to the digital pen,
the receiving device is arranged to obtain the digital pen public key from the digital pen or a separate server; and
the decryption means is arranged to decrypt the symmetric key by the public key of the digital pen in the receiving device and by the private key of the receiving device.

31. The system as claimed in claim 25, further comprising:
a verification means for identification of a user to the digital pen and/or identification of a receiver to the receiving device, said verification means being arranged to use identification measures wherein the identification measures are at least one of a PIN-code, optical, sound, vibration, heat, speed, angle, time, pressure, acceleration, absolute coordinate, handwritten signature, voice recognition, fingerprint sensor, e* and other biometric means.

32. The system as claimed in claim 31, further comprising:
encryption key generation means for obtaining a random seed for generating encryption key by means of the verification means during the identification step.

33. The system as claimed in claim 25, further comprising:
encryption key generation means for obtaining a random seed for generating an encryption key during the step of obtaining the message.

34. The system as claimed in claim 25, wherein the digital pen is arranged to generate a digital pen private key and digital pen public key pair using a random seed obtained using a physical parameter relating to a user of the digital pen, wherein the physical parameter is at least one of handwritten signature recognition, fingerprint information and movement of the digital pen wherein movement of the digital pen is at least one of acceleration, speed, time, and vibration.

35. The system as claimed in claim 34, wherein the digital pen private key is added to the message unencrypted, as digital pen identification.

* * * * *